United States Patent
Schmutz et al.

[11] Patent Number: 5,470,357
[45] Date of Patent: Nov. 28, 1995

[54] METHOD OF MAKING A LAMINATED LITHIUM-ION RECHARGEABLE BATTERY CELL

[75] Inventors: Caroline N. Schmutz, Eatontown; Frough K. Shokoohi, Fair Haven; Jean-Marie Tarascon, Martinsville; Paul C. Warren, Far Hills, all of N.J.

[73] Assignee: Bell Communications Research, Inc., Livingston, N.J.

[21] Appl. No.: 428,970

[22] Filed: Apr. 26, 1995

Related U.S. Application Data

[63] Continuation-in-part of Ser. No. 160,018, Nov. 30, 1993, Pat. No. 5,460,904, which is a continuation-in-part of Ser. No. 110,262, Aug. 23, 1993, Pat. No. 5,418,091, which is a continuation-in-part of Ser. No. 26,904, Mar. 5, 1993, Pat. No. 5,296,318.

[51] Int. Cl.$^6$ .................. H01M 6/00; H01M 6/18
[52] U.S. Cl. .................. 29/623.5; 29/623.1; 429/192
[58] Field of Search .................. 29/623.5, 623.1; 429/192

[56] References Cited

U.S. PATENT DOCUMENTS

| | | | |
|---|---|---|---|
| 4,714,665 | 12/1987 | Siegel et al. | 429/192 |
| 5,219,680 | 6/1993 | Fauteux | 429/192 |

Primary Examiner—John S. Maples
Attorney, Agent, or Firm—Leonard Charles Suchyta; Lionel N. White

[57] ABSTRACT

Li-ion rechargeable battery cell electrode and electrolyte/separator elements formulated as layers of plasticized polymeric matrix compositions are laminated with electrically conductive collector elements to form a unitary battery cell structure. Adhesion between the electrode and collector elements is enhanced by pretreatment of the collector elements in which a 0.25% to 3.0% solution of a polymeric material compatible with said matrix polymer is applied to a collector foil or grid and dried to form a coated film, and the resulting coated collector element is heated within the range of about 250° to 450° C. for about 5 to 60 seconds.

8 Claims, 4 Drawing Sheets

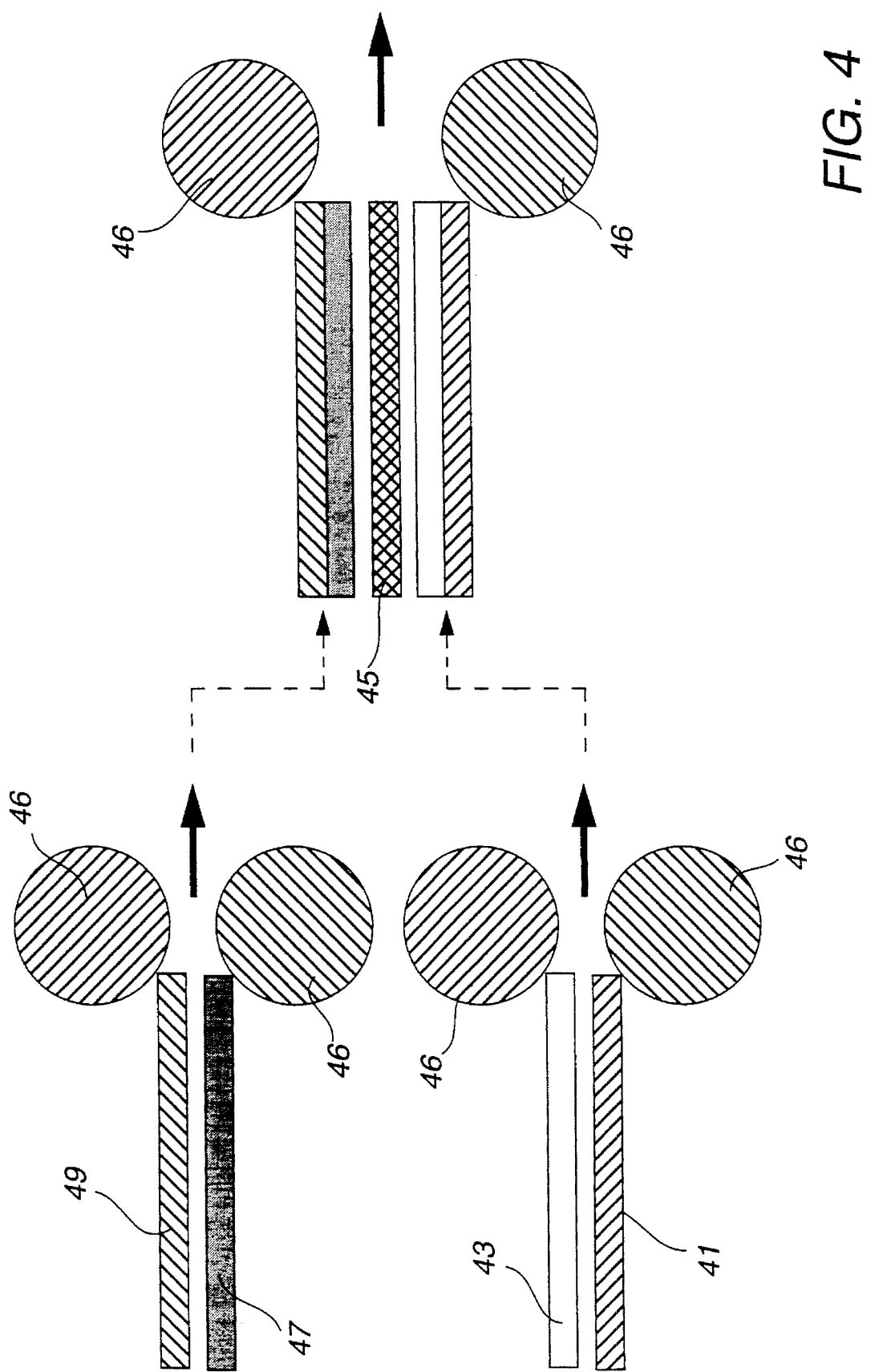

METHOD OF MAKING A LAMINATED LITHIUM-ION RECHARGEABLE BATTERY CELL

RELATED APPLICATIONS

This application is a continuation-in-part of U.S. patent application Ser. No. 08/160,018, filed 30 Nov. 1993, which is a continuation-in-part of Ser. No. 08/110,262, filed Aug. 23, 1993, now U.S. Pat. No. 5,418,091, which is a continuation-in-part of Ser. No. 08/026,904, filed Mar. 5, 1993, now U.S. Pat. No. 5,296,318.

BACKGROUND OF THE INVENTION

The present invention relates to electrolytic cells comprising polymeric film composition electrodes and separator membranes and to a method of economically making such cells. In particular, the invention relates to rechargeable lithium battery cells comprising an intermediate separator element containing an electrolyte solution through which lithium ions from a source electrode material move between cell electrodes during the charge/discharge cycles of the cell. The invention is particularly useful for making such cells in which the ion source electrode is a lithium compound or other material capable of intercalating lithium ions, and where the electrode separator membrane comprises a polymeric matrix made ionically conductive by the incorporation of an organic solution of a dissociable lithium salt which provides ionic mobility.

These flexible polymeric electrolytic cell separator membrane materials may be employed as separator elements with mechanically assembled battery cell components or in composite battery cells constructed of successively coated layers of electrode and electrolyte compositions. Preferably, however, electrolytic cells for use as rechargeable batteries are constructed of individual electrode and electrolyte composition membranes which are laminated together with outer layers of conductive metal foil serving as current collectors, typically under heat and pressure.

The present invention provides, in particular, a means of improving the adhesion between polymeric electrode membrane compositions and the collector elements during the lamination operation. Through the use of this improvement, the present electrolytic cell yields a more economical and reliable battery cell product.

SUMMARY OF THE INVENTION

Electrolytic cell electrode and separator elements utilizing polymeric materials according to the present invention preferably comprise the combination of a poly(vinylidene fluoride) copolymer matrix and 20% to 70% by weight of a compatible organic plasticizer which maintains a homogeneous composition in the form of a flexible, self-supporting film. The copolymer comprises about 75 to 92% by weight vinylidene fluoride (VdF) and 8 to 25% hexafluoropropylene (HFP), a range in which the latter comonomer limits the crystallinity of the final copolymer to a degree which ensures good film strength while enabling the retention of about 40 to 60% of preferred solvents for lithium electrolyte salts. Within this range of solvent content, the 5 to 7.5% salt ultimately comprising a hybrid electrolyte membrane yields an effective room temperature ionic conductivity of about $10^{-4}$ to $10^{-3}$ S/cm, yet the membrane exhibits no evidence of solvent exudation which might lead to cell leakage or loss of conductivity.

Electrolytic cells, such as rechargeable battery cells, are constructed according to the invention by means of the lamination of electrode and electrolyte cell elements which are individually prepared, by coating, extrusion, or otherwise, from compositions comprising the noted polyvinylidene fluoride (PVdF) copolymer materials. For example, in the construction of a lithium-ion battery, a positive electrode film or membrane is separately prepared as a coated layer of a dispersion of intercalation electrode composition, e.g., a $LiMn_2O_4$ powder in a copolymer matrix solution, which is dried to form the membrane. A positive current collector layer of aluminum foil or grid is pretreated, or primed, with a polymeric material compatible with the matrix copolymer to enhance adhesion to the positive electrode which is then overlaid upon the collector.

An electrolyte/separator membrane formed as a dried coating of a composition comprising a solution of the VdF:HFP copolymer and a plasticizer is then overlaid upon the positive electrode film. A negative electrode membrane formed as a dried coating of a powdered carbon dispersion in a copolymer matrix solution is similarly overlaid upon the separator membrane layer, and a negative copper collector foil or grid which is pretreated, or primed, in a manner similar to that of the positive collector is laid upon the negative electrode layer to complete the cell assembly. This assembly is then heated under pressure to heat-fused bonding between the plasticized copolymer matrix components and to the collector grids to thereby effect lamination of the cell elements into a unitary flexible battery cell structure.

At this stage the laminated structure comprises a significant measure of homogeneously distributed organic plasticizer, particularly in the separator membrane stratum, yet is devoid of hygroscopic electrolyte salt. As a result, the "inactive" battery cell may be stored at ambient conditions, either before or after being shaped or further processed, without concern for electrolyte deterioration due to reaction with atmospheric moisture. Only during a final operation when an electrolyte salt solution is introduced to activate the battery cell need there be concern for maintaining special conditions, such as an atmosphere of dry, inert gas.

When it is desired to so activate a battery in the final stage of manufacture, the laminate cell structure is immersed in or otherwise contacted with an electrolyte salt solution which will imbibe into the VdF:HFP copolymer membrane matrix to provide substantially the same ionic conductivity enhancement as achieved by a preformed hybrid electrolyte/separator film containing such an electrolyte salt solution. In order to facilitate the absorption of electrolyte solution, it is preferred that a substantial portion of the plasticizer be previously removed from the copolymer matrix. This may be readily accomplished at any time following the laminating operation by immersion of the cell laminate in a copolymer-inert, low-boiling solvent, such as diethyl ether or hexane, which will selectively extract the plasticizer without significantly affecting the copolymer matrix of the cell element strata. The extracting solvent may then be simply evaporated to yield a dry, inactive battery cell. The laminate structure may be stored in either plasticized or extracted form for an extended period of time prior to activation.

The battery-forming process of the present invention is readily adaptable to batch or continuous operation, since the electrode and electrolyte/separator membrane elements, as well as the collector grid foils, may be shaped or sized prior to laminate assembly or they may be laminated from confluent webs of membrane materials for later shaping or manifolding, as desired. The extraordinary advantage of the present invention lies in the fact that all such operations may be carried out at ambient conditions prior to the introduction of any vulnerable electrolyte salts.

BRIEF DESCRIPTION OF THE DRAWING

The present invention will be described with reference to the accompanying drawing of which:

FIG. 4 is a diagrammatic representation of a laminating process for preparing a battery cell structure of the present invention;

DESCRIPTION OF THE INVENTION

Figure 1:
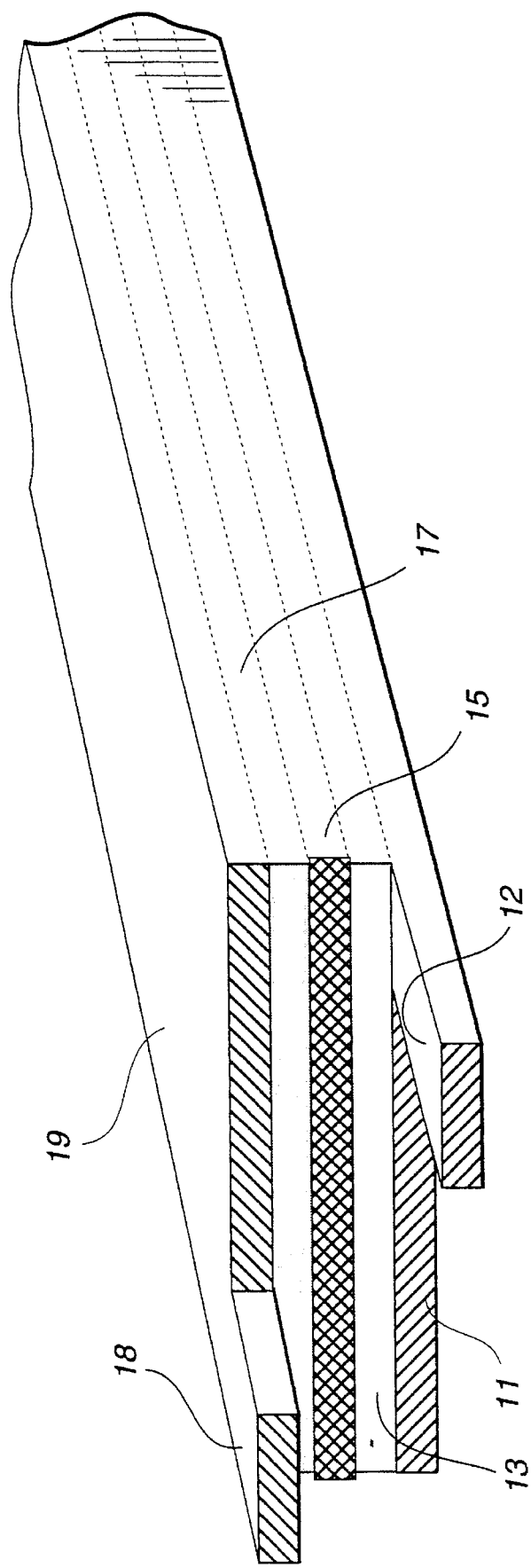
FIG. 1 is a diagrammatic representation of a typical laminated lithium-ion battery cell structure of the present invention.

A laminated rechargeable battery cell structure of the present invention as depicted in FIG. 1 comprises a copper collector foil 11, preferably in the form of a pretreated open mesh grid, upon which is laid a negative electrode membrane 13 comprising an intercalatable material, such as carbon or graphite, or a low-voltage lithium insertion compound, such as $WO_2$, $MoO_2$, or Al, dispersed in a polymeric binder matrix. An electrolyte/separator film membrane 15 of plasticized VdF:HFP copolymer is positioned upon electrode element 13 and is covered with a positive electrode membrane 17 comprising a composition of a finely-divided lithium intercalation compound, such as $LiMn_2O_4$, $LiCoO_2$, or $LiNiO_2$, in a polymeric binder matrix. A pretreated aluminum collector foil or grid 19 completes the assembly which is then pressed between platens (not shown) under heat and pressure to soften and bond the polymeric components and laminate the membrane and grid layers.

Separator membrane element 15 is generally prepared from a composition comprising the earlier-noted 75 to 92% vinylidene fluoride (VdF): 8 to 25% hexafluoropropylene (HFP) copolymer (available commercially from Atochem North America as Kynar FLEX) and a compatible organic plasticizer. Such a copolymer composition is also preferred for the preparation of the electrode membrane elements, since subsequent laminate interface compatibility is ensured. The plasticizer may be one of the various organic compounds commonly used as solvents for electrolyte salts, e.g., propylene carbonate or ethylene carbonate, as well as mixtures of these compounds. Higher-boiling plasticizer compounds, such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

Any common procedure for casting or forming films or membranes of polymer compositions may be employed in the preparation of the present membrane materials. Where casting or coating of a fluid composition is used, e.g., with meter bar or doctor blade apparatus, the viscosity of the composition will normally be reduced by the addition of a readily evaporated casting solvent, such as tetrahydrofuran (THF), acetone, or the like. Such coatings are normally air-dried at moderate temperature to yield self-supporting films of homogeneous, plasticized copolymer compositions. A membrane material, particularly for use as a separator element, may also be formed by allowing the copolymer in commercial form, i.e., bead or powder, to swell in a proportionate amount of plasticizer and then pressing the swollen mass between heated (e.g., about 130° C.) plates or rollers, or extruding the mixture.

In order to provide electrolytic battery cell terminals, the respective electrode membranes are maintained in intimate contact with conductive current collector elements, usually metal foils. While in cells of stacked layer structure a constant pressure is relied upon to yield such contact between the elements, the lamination of the present cell provides both the electrical continuity and the flexible cell integrity. In accordance with the present invention, pretreatment of the collector elements with an electrode-compatible polymeric material, preferably by application of a 0.25% to 2.5% solution of a copolymer similar to that of the electrode matrix, typically VdF with 6% to 25% HFP, and heating at 250° to 450° C. for about 5 to 50 seconds ensures persistent adhesion upon lamination. A somewhat heavier layer of the copolymer alone, e.g., that obtained by dipping in a 3% solution of the pretreatment polymer, provides improved adhesion without a post-heating operation.

As with the membrane-forming operations, lamination of assembled cell structures may be accomplished by commonly-used apparatus. Preshaped or sized assemblies may be simply pressed for a short while between metal plates weighted at about $3 \times 10^4$ to $5 \times 10^4$ Pa in an oven at a temperature of about 120° to 160° C. or in a heated press providing similar conditions. Where continuous webs of component membranes are employed, the operation may be carried out using heated calender rollers.

Subsequent to lamination, the battery cell material may be stored under normal conditions, either with the retained plasticizer or as a "dry" sheet after extraction of the plasticizer with a selective low-boiling solvent, for any length of time prior to final battery processing and activation. The laminate may be die-punched into coins for use in the familiar "button" batteries or elongated sheets of the flexible laminated cell material may be rolled with an interposed insulator or manifolded to yield a compact, high-density structure to be sealed with activating electrolyte solution in a protective enclosure.

Although a plasticized copolymer matrix, particularly that of the separator stratum, will readily imbibe an electrolyte salt solution which, in effect, displaces the plasticizer, it is preferable to extract the plasticizer to facilitate absorption of the fluid electrolyte. While an extracted, "dry" battery cell laminate possesses no discernible voids, it appears to exhibit a solvent recovery "memory" which prompts the rapid absorption of an amount of electrolyte solution substantially equal to that of the initial plasticizer. In this manner, the desired ion conductivity range of up to about $10^{-3}$ S/cm is readily achieved.

A number of electrolytic cell laminates with compositions comprising VdF:HFP copolymers within the noted monomer ratio range were prepared and tested for electrolytic and physical suitability for use in rechargeable batteries cells. The following examples are illustrative of such preparation and use.

EXAMPLE 1

A coating composition was prepared by suspending 1.5 g of an 85:15 VdF:HFP copolymer of about $260 \times 10^3$ MW (Atochem Kynar FLEX 2750) in 10 g of acetone and 1.5 g of propylene carbonate (PC). The mixture was warmed to about 50° C. to facilitate dissolution and with occasional agitation a solution was obtained which retained its fluidity upon standing at room temperature for a number of hours. The solution was cast upon a glass plate with a doctor-blade device gapped at about 1.5 mm and was allowed to dry in air at room temperature for about 10 minutes. The resulting dry, clear, tough, flexible film was readily removed from the glass substrate and was divided into test samples. A few samples were completely extracted with diethyl ether to remove the homogeneously dispersed PC plasticizer which was then calculated to be present in the original samples at a level of about 47.7% by weight. Such a film with retained plasticizer (PC) represents the "wet" form of polymeric electrolyte/separator membrane material which may be stored for later convenient assembly with cell electrode elements. The test sample films from which the PC had been extracted represents the "dry" form of the membrane material.

EXAMPLE 2

A control film material was prepared as in Example 1 with the exception that the PC plasticizer was not added. The resulting film was clear, tough, and flexible, although, understandably, not as extensible as the plasticized sample. Samples of the "wet", "dry", and control films were immersed for a few minutes in a typical rechargeable lithium battery electrolyte solution, viz., a 1M solution of $LiPF_6$ in a 1:1 mixture of ethylene carbonate and propylene carbonate (EC/PC). The samples were then wiped to remove any surface accumulation of electrolyte solution, weighed, and extracted with PC and diethyl ether, in turn, to remove imbibed electrolyte solution. It was then calculated that the control sample absorbed about 27% electrolyte solution, while the preswollen "wet" sample took up about 47%, a nearly complete substitution for the original amount of the PC plasticizer in the membrane before immersion in electrolyte. The remaining "dry" sample, that from which the original PC plasticizer had been extracted, absorbed about 37% electrolyte solution, nearly 40% more than the control sample. This increase in absorption capacity is indicative of the swelling "memory" imparted to the film by the initial plasticizer content. The ionic conductivity of the membrane samples thus swollen by immersion in electrolyte solution were tested for conductivity according to the usual ac impedance method on common test equipment, e.g., a Hewlett-Packard computer-controlled HP4192A capacitance bridge operating over the frequency range of 5 Hz to 10 MHz. The "wet", "dry", and control film samples exhibited ionic conductivities of about $3\times10^{-4}$, $9\times10^{-5}$, and $5\times10^{-5}$ S/cm, respectively.

EXAMPLE 3

Test samples were prepared in the manner of Example 2 with substitution of dibutyl phthalate (DBP) for the PC plasticizer. The absorption of electrolyte by the "wet" and "dry" samples during immersion increased significantly over the PC samples, amounting to about 65% and 45%, respectively. Ionic conductivity of the samples increased accordingly, measuring about $2\times10^{-3}$ and $3\times10^{-4}$ S/cm, respectively.

EXAMPLE 4

Test samples according to Examples 1–3 were prepared with tetrahydrofuran (THF) instead of acetone. The results of electrolyte absorption and ionic conductivity tests were substantially similar.

EXAMPLE 5

Indicative of other film formation techniques which may be used, about 50 parts by weight of the 85:15 copolymer of Examples 1 were suspended, without acetone vehicle solvent, in an equal amount by weight of dibutyl phthalate and allowed to swell until substantially homogeneous. The resulting swollen mass was then pressed at about 130° C. for 1 min between polished aluminum plates separated by 0.15 mm shims. After cooling to room temperature, the resulting clear, flexible film sheet was readily removed from the plates. A sample section of the sheet was then extracted with diethyl ether and reswollen in the electrolyte solution of Example 2 to yield an electrolyte/separator membrane retaining about 40% electrolyte solution and exhibiting an ionic conductivity of about $1\times10^{-4}$ S/cm.

EXAMPLE 6

An electrolyte/separator membrane coating solution was prepared by suspending 2.0 g of an 88:12 VdF:HFP copolymer of about $380\times10^3$ MW (Atochem Kynar FLEX 2801) in about 10 g of acetone and adding to this mixture about 2.0 g of dibutyl phthalate (DBP). The completed mixture was warmed to about 50 ° C. to facilitate dissolution and with occasional agitation a solution was obtained which retained its fluidity after standing at room temperature for a number of hours. A portion of the solution was coated on a glass plate with a doctor blade device gapped at about 0.5 mm. The coated film was allowed to dry within the coating enclosure under moderately flowing dry air at room temperature for about 10 min to yield a clear, tough, elastic membrane which was readily stripped from the glass plate. The film was about 85 μm thick with a dry basis weight of about 0.1 kg/m$^2$ and was easily cut into rectangular separator elements of about 175×45 mm which could be stored for days at ambient room conditions without significant weight loss.

EXAMPLE 7

A positive electrode coating composition was prepared by homogenizing in a lid-covered stainless steel blender for about 10 min at 4000 rpm a mixture of 10.5 g of Li$_{1+x}$Mn$_2$O$_4$, where $0<x\leq1$ (e.g., Li$_{1.05}$Mn$_2$O$_4$ prepared in a manner described in U.S. Pat. No. 5,196,279), sieved through 53 μm, 2.8 g of the VdF:HFP copolymer (FLEX 2801) of example 6, 4.3 g dibutyl phthalate, 1.125 g Super-P conductive carbon, and about 20 g acetone. The resulting paste was degassified by briefly applying a reduced pressure to the mixing vessel, and a portion was then coated on a glass plate with a doctor blade device gapped at about 1.1 mm. The coated layer was allowed to dry within the coating enclosure under moderately flowing dry air at room temperature for about 10 min to yield a tough, elastic film which was readily stripped from the glass plate. The film was about 0.3 mm thick with a dry basis weight of about 0.6 kg/m$^2$ and was easily cut into rectangular electrode elements of about 165×40 mm. These film elements could be stored for days at ambient room conditions without significant weight loss.

EXAMPLE 8

A negative electrode coating composition was prepared by homogenizing in a lid-covered stainless steel blender for about 10 min at 4000 rpm a mixture of 7.0 g of a commercial petroleum coke (ball-milled and sieved through 53 μm), 2.0 g of the VdF:HFP copolymer (FLEX 2801) of example 6, 3.12 g dibutyl phthalate, 0.37 g Super-P conductive carbon, and about 12 g acetone. The resulting paste was degassified by briefly applying a reduced pressure to the mixing vessel, and a portion was then coated on a glass plate with a doctor blade device gapped at about 0.6 mm. The coated layer was allowed to dry within the coating enclosure under moderately flowing dry air at room temperature for about 10 min to yield a tough, elastic film which was readily stripped from the glass plate. The film was about 0.2 mm thick with a dry basis weight of about 0.3 kg/m$^2$ and was easily cut into rectangular electrode elements of about 165×40 mm. These film elements could be stored for days at ambient room conditions without significant weight loss.

EXAMPLE 9

A 180×40 mm copper negative current collector foil 11, preferably in the form of an open mesh grid of about 50 μm thickness (e.g., a MicroGrid precision expanded foil marketed by Delker Corporation), was trimmed at one end to form a tab 12 which would subsequently serve as a convenient battery terminal. To enhance the ensuing adherence to its associated electrode element, grid 11 was surface-cleaned of oils and oxidation by immersing for a few seconds in a common "copper bright" solution (mixed dilute $HNO_3$, $H_2SO_4$), rinsed in water, air dried, and surface-treated with the matrix polymer comprising the negative electrode composition. To examine the efficacy of the treatment, a number of grid samples were respectively dip-coated in 0.25% to 3.0% acetone solutions of the VdF:HFP copolymer of Example 6, air dried, and oven heated within the range of about 250° to 450° C. for periods ranging from 5 to 60 seconds, depending upon the concentration of the polymer solution. Adhesion between the electrode and treated collector elements upon subsequent lamination according to Example 10 was improved in substantially all instances over that in which untreated collector foil was used. Comparable results were obtained with a 94:6 VdF:HFP copolymer. Based upon economy of time and materials, a preferred treatment employed a 0.5% to 1.5% solution of the copolymer with heating at about 300° to 350° C. for about 5 to 30 seconds. A particularly preferred treatment utilized a solution of about 0.5% copolymer with heating at about 340° C. for about 5 to 20 seconds. It was observed that a heating temperature of not more than 350° C. is generally preferred in order to avoid significant copper oxidation and thus maintain optimum electrical conductivity at the collector surface. It was also noted that the heating step may be eliminated by using a dip coating solution comprising about 3% each of the copolymer and electrode composition plasticizer, such as dibutyl phthalate. Aluminum positive current collector foils, or grids, were prepared in substantially similar manner after a simple cleansing rinse in acetone.

EXAMPLE 10

Rechargeable battery structures were assembled from component collector, electrode, and electrolyte elements prepared in the manner of the foregoing examples. The conditions of electrode preparation may be varied, either in coating composition consistency or coated layer thickness, to obtain a basis weight ratio of active intercalation compound in the positive:negative electrode combination between about 1.5 and 2.5, preferably about 2.2. A basic battery cell structure as depicted in FIG. 1 was assembled in the following manner:

A negative grid 11 of Example 9 was laid smoothly upon a flat rigid base plate (not shown) of a good heat conductive material, such as aluminum. A carbon negative electrode element 13, as prepared in Example 8, was overlaid upon grid 11, and was itself overlaid with electrolyte/separator element 15, as prepared in Example 6. The slightly larger dimensions of element 15 provide protection from possible misalignment and undesirable contact between the electrode elements of the assembled battery structure. Positive electrode element 17, as prepared in Example 7, was then positioned upon separator element 16, and a treated aluminum collector foil or grid 19 was positioned upon electrode 17 so as to provide a transversely situated terminal tab 18. It should be noted that at least one of the current collector elements has an open grid structure to facilitate the passage of extraction and activating fluids during the ensuing battery preparation operations.

The resulting structure was then covered with a second similar rigid plate (not shown), and the assembly was placed in a 135° C. oven and weighted with about 24 kg to provide a pressure of about $3.7 \times 10^4$ Pa at the element interfaces. The assembly remained in the oven for about 30 minutes to ensure temperature equilibrium in the plate sinks and effect adequate fusion of the battery elements. The laminate structure was then remove from the oven, unweighted, and cooled between a pair of room temperature metal plates. In order to enhance the bonding or embedding of the collector grids in a final single cell structure, about 50 μm membranes of electrolyte/separator composition (not shown) may be overlaid upon the grid elements prior to lamination, or, preferably, about 20 μm coatings of the composition may be applied over the surfaces of a laminated structure.

EXAMPLE 11

The battery structure of Example 10 was prepared for "dry" film activation, as described in Example 2, by immersion of the laminate structure in diethyl ether at room temperature for about 25 minutes to remove substantially all of the DBP plasticizer from the layered elements, notably the electrolyte/separator 15. This extraction was carried out with a minimum of agitation of the immersion solvent. Extraction time for similar structure samples was reduced to about 10 min with mild agitation, e.g., from stirring or bubbling air, and was optimally reduced to about 3 minutes with continuous countercurrent processing using fresh extraction solvent. Other useful solvents include pentane, petroleum ether, hexane, and cyclohexane.

EXAMPLE 12

An extracted battery structure from Example 11 was activated in preparation for charge/discharge cycling by immersion under a substantially moisture-free atmosphere in a 1M electrolyte solution of $LiPF_6$ in 50:50 ethylene carbonate (EC): dimethyl carbonate (DMC) for about 20 min during which the laminated battery imbibed about 31% of its extracted weight. Following a mild wiping with absorbent materials to remove surface electrolyte, the activated battery structure was hermetically sealed, but for the extending terminal tabs 12, 18, within a polyolefin envelope (not shown) to maintain a moisture-free environment. A similar battery sample was prepared by enclosing the extracted battery structure within the envelope with the measured amount of electrolyte solution.

EXAMPLE 13

Figure 2:
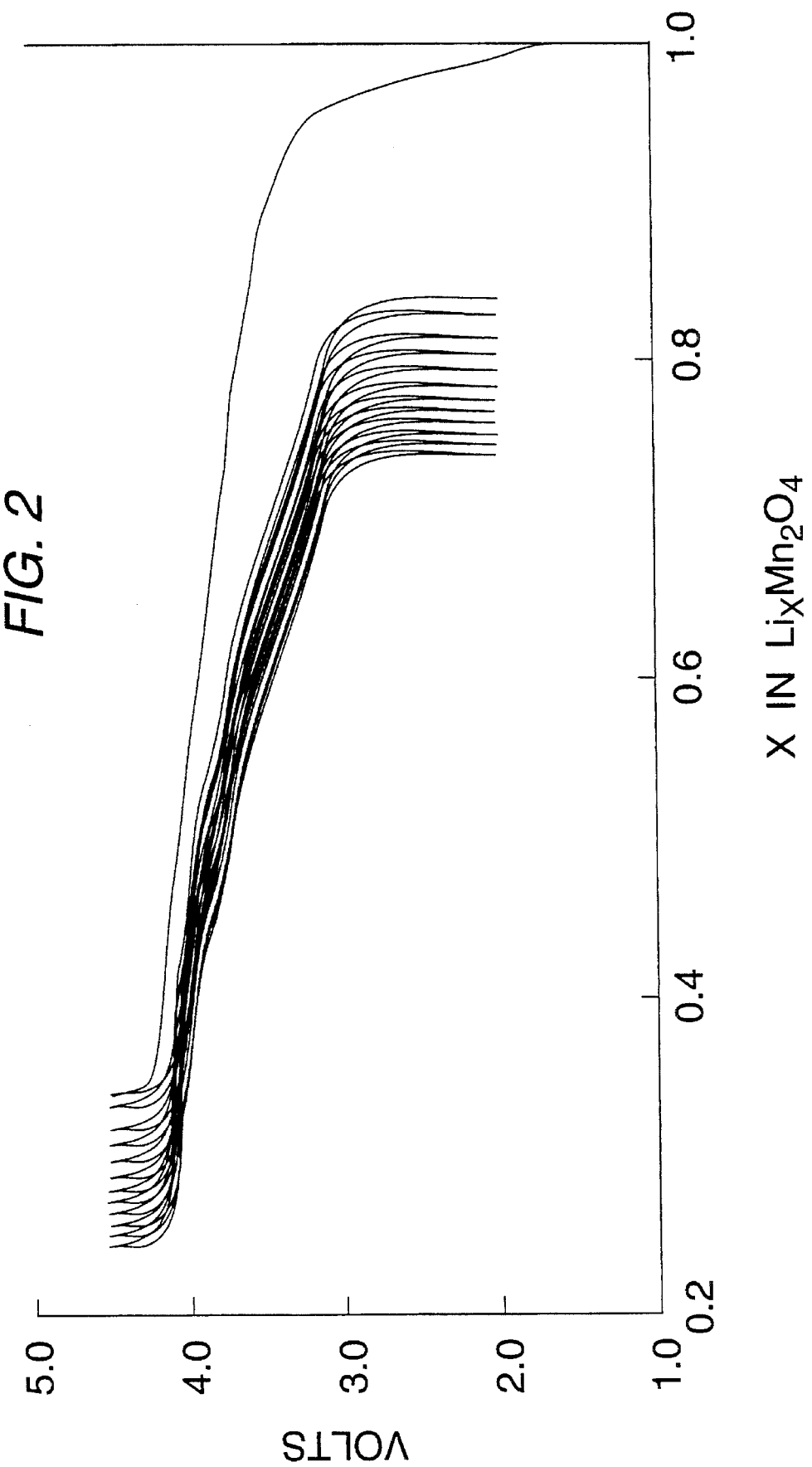
FIG. 2 is a graph tracing recycling voltage as a function of intercalated lithium for a laminated lithium-ion battery cell of FIG. 1.
Figure 3:
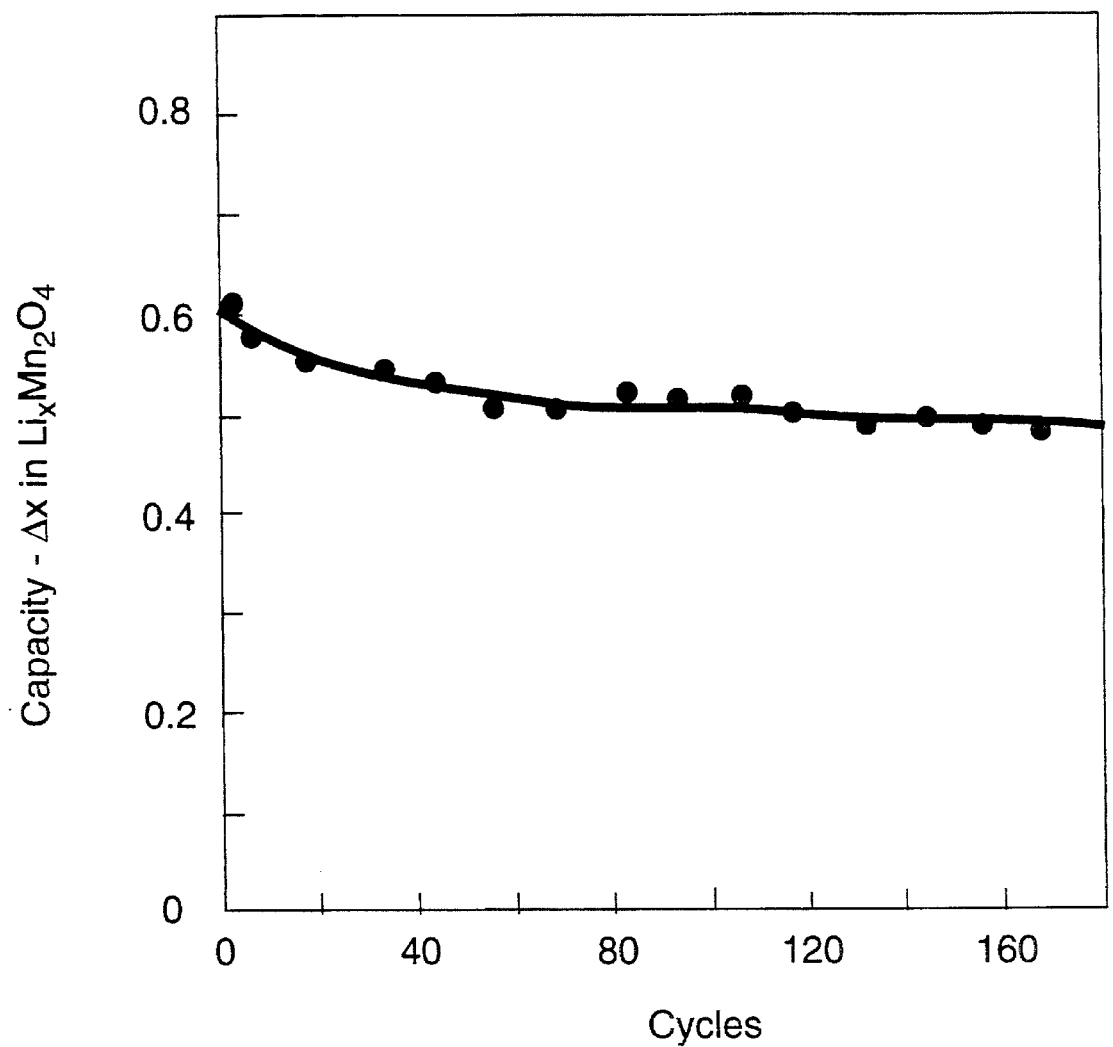
FIG. 3 is a graph of the capacity of a laminated lithium-ion battery cell of FIG. 1 as a function of the number of charge/discharge cycles.

The activated battery of Example 11 was tested by cycling between 2 and 4.5 V at a rate of 10 mA which was maintained constant within 1% in a "Mac Pile" cycling system from Bio-Logic of Claix, France. Operating in the galvanostatic mode, this system calculated from elapsed time and current the lithium content, x, in the $Li_xMn_2O_4$ positive electrode. The multicycle trace of these data are shown in FIG. 2 and is indicative of the stability of the battery. The trace of cell capacity over extended charging cycles is shown in FIG. 3.

EXAMPLE 14

In a preferred variant of the present laminate battery assembly method, as depicted in FIG. 4, a copper collector grid 41, pretreated as in Example 9 with a 1% copolymer solution and heating at about 350° C. for about 25 seconds, and a negative electrode element 43, as prepared in Example 8, were assembled between buffer sheets of abherent polyethylene terephthalate (not shown) and were passed through the rolls 46 of a commercial card-sealing laminator at a temperature of about 150° C. A 50 μm film of electrolyte/separator composition may also be inserted on top of the grid prior to lamination. A treated aluminum collector grid 49 of Example 9 and a positive electrode element 47, as prepared in Example 7, were similarly laminated to provided a pair of electrode/collector battery elements. An electrolyte/separator element 45 from Example 6 was then inserted between the electrode/collector pair and the resulting assembly was passed through the laminator device at a roll temperature of about 120° C. with somewhat less pressure to obtain the laminate battery structure. The laminate was then immersed under moisture-free conditions in a mildly stirred electrolyte solution from Example 12 for about 40 minutes to effect substantial replacement of the DBP plasticizer with the electrolyte solution. The activated battery, having a thickness of about 0.5 mm, was then sealed in a protective polyolefin envelope enclosure (not shown) and tested according to Example 13. The resulting performance trace substantially matched that of FIG. 2.

The battery structures of the present invention may be successfully activated with any of the numerous compositions used as liquid electrolyte solutions. Notably, there may be employed in the electrolyte solution such organic solvents as dimethyl carbonate, diethoxyethane, diethyl carbonate, dimethoxyethane, and dipropyl carbonate. Also, in the formulation of the activating electrolyte solutions, other useful lithium salts, including $LiClO_4$, $LiN(CF_3SO_2)_2$, $LiBF_4$, $LiCF_3SO_3$, and $LiSbF_6$, may be employed in solution concentrations of between about 0.5 and 2M. Of particular utility are the exceptional ethylene carbonate/dimethyl carbonate compositions of $LiPF_6$ and mixtures with $LiBF_4$ described in U.S. Pat. No. 5,192,629. While the above examples have related in large measure the preparation of a number of battery assemblies, other variants are likewise to be included within the scope of the invention as set out in the appended claims.

What is claimed is:

1. A method of making a rechargeable battery structure which comprises arranging contiguously a positive current collector element, a positive electrode element, a separator element, a negative electrode element, and a negative current collector element characterized in that
   a) each of said electrode and separator elements comprises a flexible, polymeric matrix film composition,
   b) each of said collector elements comprises a flexible electrically-conductive foil which has been surface treated with a polymeric material compatible with the matrix composition of its contiguous electrode, and
   c) said method further comprises bonding each said element to contiguous elements at its respective interfaces by the application of heat and pressure to form a unitary flexible laminate structure.

2. A method according to claim 1 characterized in that the surface treatment of a collector element comprises:
   a) coating the surface of said collector element with a solution comprising about 0.25% to 3.0% of said polymeric material, and
   b) drying to remove the solvent.

3. A method according to claim 1 wherein the surface treatment further comprises heating the coated collector element within the range of about 250° to 450° C. for about 5 to 60 seconds.

4. A method according to claim 3 wherein at least one of said collector element foils comprises an open-mesh grid and said method further comprises respectively bonding at least one of said positive and negative collector elements to said positive and negative electrode elements prior to bonding said electrode elements to said separator element.

5. A method according to claim 3 wherein said collector element surface is coated from a solution comprising about 0.5% to 1.5% of said polymeric material and said coated collector element is heated within the range of about 300° to 350° C. for about 5 to 30 seconds.

6. A method according to claim 5 wherein said collector element surface is coated from a solution comprising about 0.5% of said polymeric material and said coated collector element is heated at about 340° C. for about 5 to 20 seconds.

7. A method according to claim 2 wherein:
   a) at least one of said collector element foils comprises an open-mesh grid;
   b) said polymeric matrix composition comprises a copolymer of vinylidene fluoride with 8% to 25% by weight hexafluoropropylene and has homogeneously distributed therein 20 to 70% by weight of an organic plasticizer compatible with said copolymer; and
   c) said polymeric treatment material comprises a copolymer of vinylidene fluoride with 6% to 25% by weight hexafluoropropylene.

8. A method according to claim 7 characterized in that the surface treatment of a collector element comprises:
   a) coating the surface of said collector element by applying thereto a solution comprising about 3.0% each of said treatment copolymer and said matrix plasticizer, and
   b) drying said coated collector element to remove the solvent.

* * * * *